May 30, 1961 F. S. MACKLEM 2,986,727

CYCLIC DIGITAL-TO-ANALOG CONVERTER

Filed Nov. 18, 1957 2 Sheets-Sheet 1

INVENTOR
F. SUTHERLAND MACKLEM
BY
Mitchell & Bechert
ATTORNEYS

May 30, 1961 F. S. MACKLEM 2,986,727

CYCLIC DIGITAL-TO-ANALOG CONVERTER

Filed Nov. 18, 1957 2 Sheets-Sheet 2

INVENTOR

F. SUTHERLAND MACKLEM

BY

Mitchell & Bechert

ATTORNEYS 2,986,727

CYCLIC DIGITAL-TO-ANALOG CONVERTER

F. Sutherland Macklem, Freeport, N.Y., assignor to Servo Corporation of America, New Hyde Park, N.Y., a corporation of New York Filed Nov. 18, 1957, Ser. No. 697,251

12 Claims. (Cl. 340—347)

This invention relates to digital data transmission systems and more particularly to digital-to-analog converters employed as components thereof.

In the present state of the electronic art, digital-to-analog converters of conventional design are comparatively complicated and expensive devices, especially for processing digital data having a large number of digits which represent complex numbers, the complex number being represented by magnitudes and angles.

A principal object of this invention is to provide an improved digital-to-analog converter.

Another object of this invention is to provide a relatively simple and inexpensive digital-to-analog converter for processing complex numbers.

Other objects and various further features of the invention will be pointed out or will occur to those skilled in the art from a reading of the following specification in conjunction with the accompanying drawing. In said drawing, which shows, for illustrative purposes only, preferred forms of the invention:

As contemplated, there is provided a voltage-dividing network having resistive elements which are selectively changeable by a plurality of switches. Each switch is controlled by single-digit pulsating signals from a digital-data-transmission system. Component elements and the excitation of the voltage-dividing network are selected to provide an output voltage in correspondence with the input binary digital data. For converting cyclic numbers directly into complex numbers, the voltage-dividing network is energized by an alternating-current carrier to provide a pair of complementary voltages for the two deflection systems of a cathode-ray tube. The entire capacity of the voltage-dividing network for the resolution of the scope trace in one quadrant on the scope face is employed (in combination with a pair of switches and a pair of center-tapped transformers disposed between the voltage-dividing network and the cathode-ray tube) for selectively deflecting the scope trace in the other three quadrants, each such switch being controlled by the first or second digit in the digital-data transmission system. The angular displacement and magnitude of the scope trace is thereby the analog of the complex number conversion of the input cyclic numbers.

Figure 1:
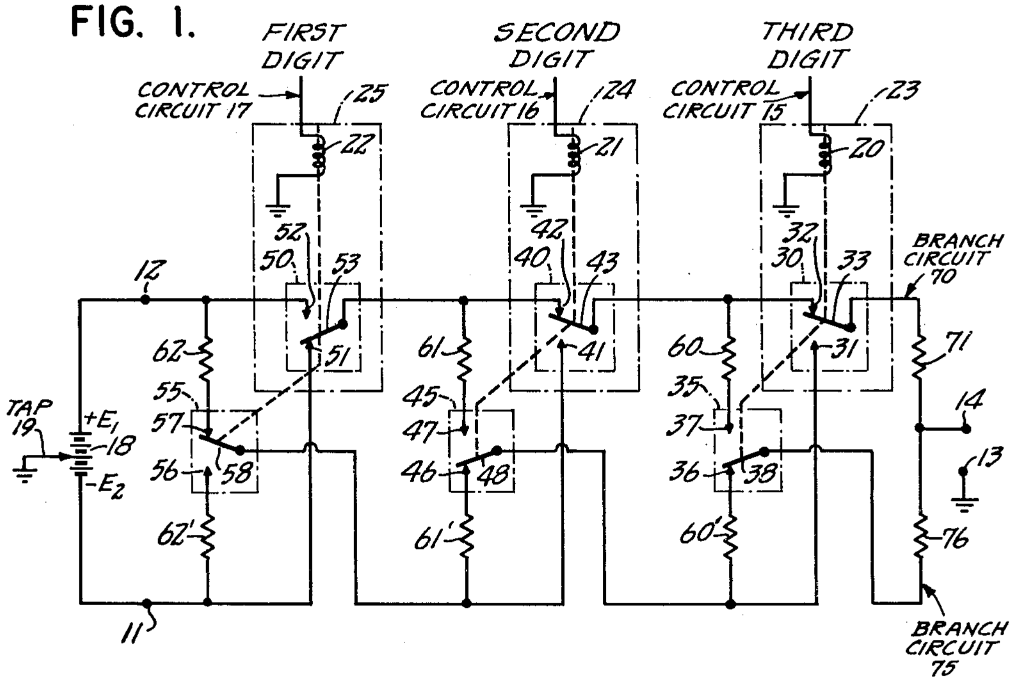
Fig. 1 is an electrical schematic diagram of a three-digit digital-to-analog converter for deriving a periodic analog output directly from cyclic numbers.

Referring to Fig. 1, the invention is illustrated as a digital-to-analog converter for accommodating three-digit binary-coded signals which represent eight discrete numbers. The converter has two input terminals 11—12, two output terminals 13—14, and individual digit-control circuits 15—16—17; terminal 13 and one side of each of the circuits 15—16—17 are shown grounded. The positive terminal of a D.-C. source 18, such as a battery, is connected to terminal 12, the negative terminal is connected to terminal 11, and a tap 19 on the battery is grounded, thereby establishing the potential of terminal 12 at $E_1$ volts and the potential of terminal 11 at $-E_2$ volts for a total battery voltage of $E_1+E_2$. Control circuits 15—16—17 are terminated in solenoid coils 20—21—22 of relays 23—24—25, respectively.

Relay 23 includes two poles or sets of double-throw elements 30—35. The upper pole 30 includes upper and lower contacts 31—32 and an arm 33 normally engaging the upper contact 32; the lower pole 35 includes upper and lower contacts 36—37 and an arm 38 normally in contact with the lower contact 36. In like manner, relay 24 includes double-throw elements 40—45 having contacts 41—42 associated with arm 43 (normally engaging contact 42) and having contacts 46—47 associated with arm 48 (normally engaging contact 46). Similarly, relay 25 includes double-throw elements 50—55 having contacts 51—52 associated with arm 53 (normally engaging contact 51) and having contacts 56—57 associated with arm 58 (normally engaging contact 57).

A resistor 60, of resistance 2R ohms, is connected from contact 37 to contacts 43 and 32, and a resistor 60′ having the same resistance as resistor 60 is connected from contact 36 to contacts 48 and 31. A resistor 61, of resistance 4R ohms, is connected from contact 47 to contacts 53 and 42, and a resistor 61′ having the same resistance as resistor 61 is connected from contact 46 to contacts 58 and 41. A resistor 62, of a resistance 8R ohms, is connected from contact 57 to contact 52 and terminal 12, and a resistor 62′ having the same resistance as resistor 62 is connected from contact 56 to contact 51 and terminal 11.

A branch circuit 70 connected between output terminal 14 and battery 18 includes a resistor 71 having a resistance of R ohms, the resistor being connected between terminal 14 and contact 33. Another branch circuit 75 from output terminal 14 to the other side of battery 18 includes a resistor 76 having a resistance equal to that of resistor 71, resistor 76 being connected between terminal 14 and contact 38. The other components of branch circuits 70 and 75 and the resulting voltage output across terminals 13 and 14 depend upon the simultaneous states of the binary coded pulses in digit-control circuits 15—16—17. For the converter in Fig. 1, it will be assumed that the first, second and third digit imputs, as read from left to right in the three-digit code, will be impressed upon circuits 17—16—15, respectively.

When the input digital pulses in circuits 17—16—15 are zero, zero and zero, respectively, branch circuit 70 consists of resistor 71 (R ohms), while branch circuit 75 consists of resistors 76, 60′, 61′ and 62 (15R ohms). By selecting an 8-volt battery with a 0.5-volt tap for the D.-C. source 18, the resulting potential at terminal 14 is zero volts, corresponding to an input of zero, zero, zero. When the input digital pulses in circuits 17—16—15 are zero, zero, one, respectively, the arms 53—58 of relay 25 are shifted, so that branch circuit 70 consists of resistors 71, 61′ and 62 (13R ohms), while branch circuit 75 consists of resistors 76 and 60 (3R ohms); such a voltage dividing network provides a resulting potential at terminal 14 of one volt. Similarly, for the six remaining combinations of pulses in control circuits 17—16—15 of: zero, one, one; zero, one, zero; one, one, zero; one, one, one; one, zero, one; and one, zero, zero; a voltage-dividing analysis effected by the branch circuits 70 and 75 will yield terminal 14 potentials of two volts, three volts, four volts, five volts, six volts and seven volts, respectively.

Hence it can be seen that as the three relays 23—24—25 are operated in cyclic sequence, the output voltages across terminals 13 and 14 are scalar quantities corresponding to the cyclic numbers represented by the pulses in the control circuits. It will be apparent to those skilled in the art that the converter can be modified for accommodating four-digit pulses by including another control circuit, another relay and another pair of resistors, each resistor of this pair of resistors having a resistive value equal to 16R. Additional digits can be accommodated by incorporating additional pairs of resistors for each added digit, the resistance of successive pairs of resistors being double that of the immediately preceding pair of resistors.

It will be observed for the embodiment shown in Fig. 1 that when relays 23—24—25 are operated in the cyclic sequence of the above paragraphs, the sequence of analog voltages 0, 1, 2, 3, 4, 5, 6 and 7 volts appearing across output terminals 13 and 14 is periodic but not cyclic. For the control of a cyclic system, such a periodic sequence is awkward because of the discontinuity at zero. Furthermore, a purely cyclic sequence which indicates no more than direction is often unsuitable because, in general, control devices require indication of magnitude as well as direction. Hence, a more suitable output would be an analog of a rotating vector.

Figure 2:
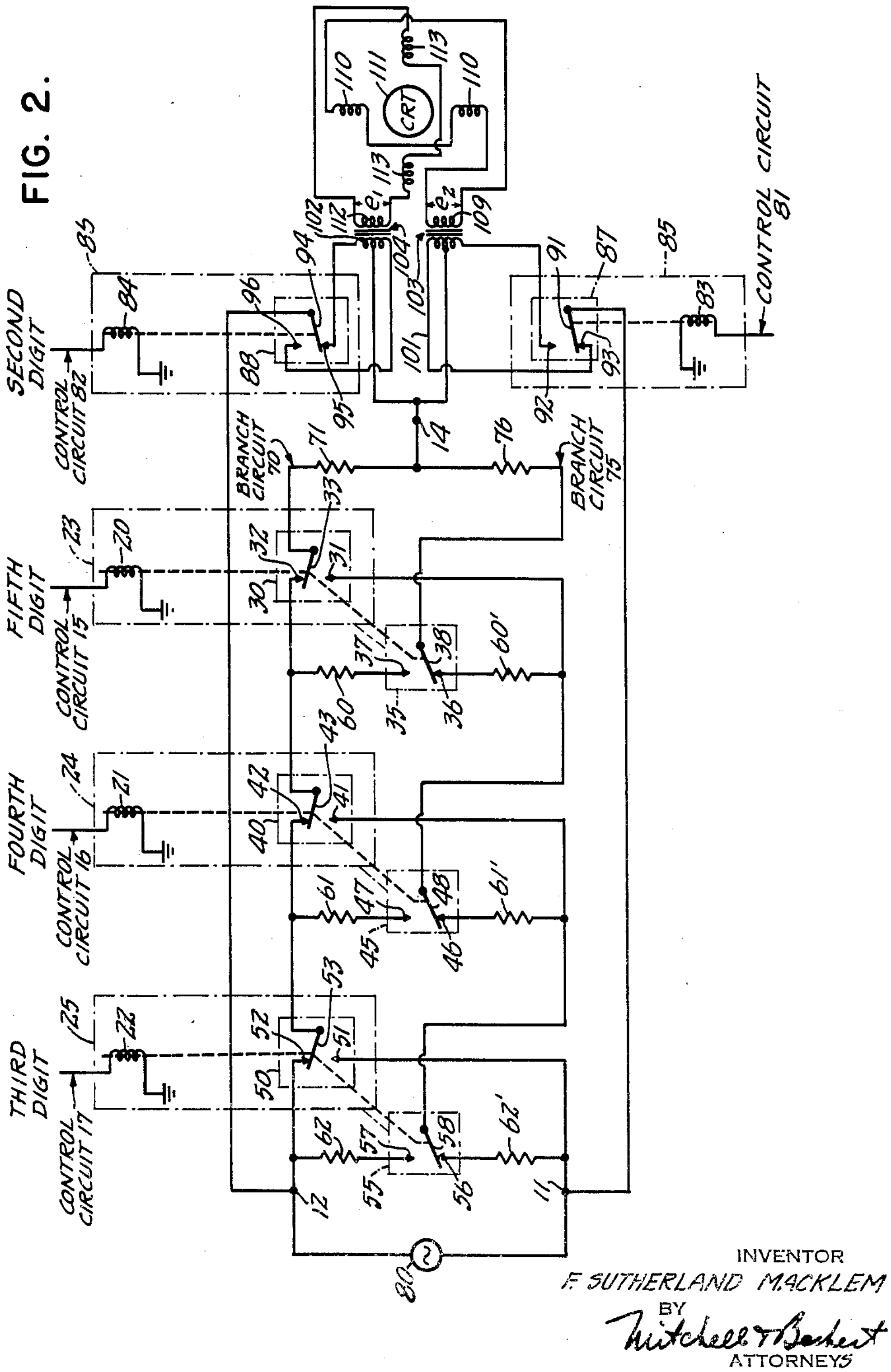
Fig. 2 is a modified schematic diagram of the converter in Fig. 1 for converting cyclic numbers directly into analogs of complex numbers.

As is generally known, a vector can be represented by a pair of complementary scalar numbers and the analog of a rotating vector, or by a complementary pair of functions. Fig. 2 illustrates a circuit for deriving a complementary pair of functions suitable for representing a rotating vector. The circuit shown will handle five-digit cyclic numbers and, therefore, has 32 positions. In order to simplify the understanding of the embodiment of the invention in Fig. 2, like reference numbers will be used to identify corresponding elements with those of Fig. 1. Since an A.-C. source 80 is connected across the input terminals 11 and 12, the contact arms 53 and 58 of the poles 50—55 of relay 50 can have a "normally open" position, with arms 53 and 58 engaging contacts 52 and 46, respectively.

In Fig. 2, the first and second digit pulses of the five-digit code system are impressed upon control circuits 81 and 82; while the third, fourth and fifth digit pulses are impressed upon control circuits 17—16—15, respectively. Control circuits 81 and 82 are terminated in solenoid coils 83 and 84 of relays 85 and 86, respectively, one side of each solenoid coil being grounded. Relays 85 and 86 include single-pole-double-throw switches 87—88, respectively. Switch 87 has a contact arm 91 and fixed contacts 92—93, the arm 91 engaging contact 92 when relay 85 is in its "normally open" or deenergized state. The contact arm 94 of switch 88 engages a fixed contact 95 for the "normally open" state of relay 86 and engages a fixed contact 96 when solenoid coil 84 is energized.

Switch contacts 94 and 91 are connected to input terminals 12 and 11, respectively. Output terminal 14 is connected to the centertaps of primary windings 101 and 102 of transformers 103 and 104, respectively. The outside terminals of primary winding 101 are connected to switch contacts 92 and 93, while the outside terminals of primary winding 102 are connected to switch contacts 95 and 96. A secondary winding 109 of transformer 103 is connected across the horizontal deflection-coil system 110 of a cathode-ray tube 111, and a secondary winding 112 of transformer 104 is connected across a vertical deflection-coil system 113 of the cathode-ray tube 111.

Figure 3:
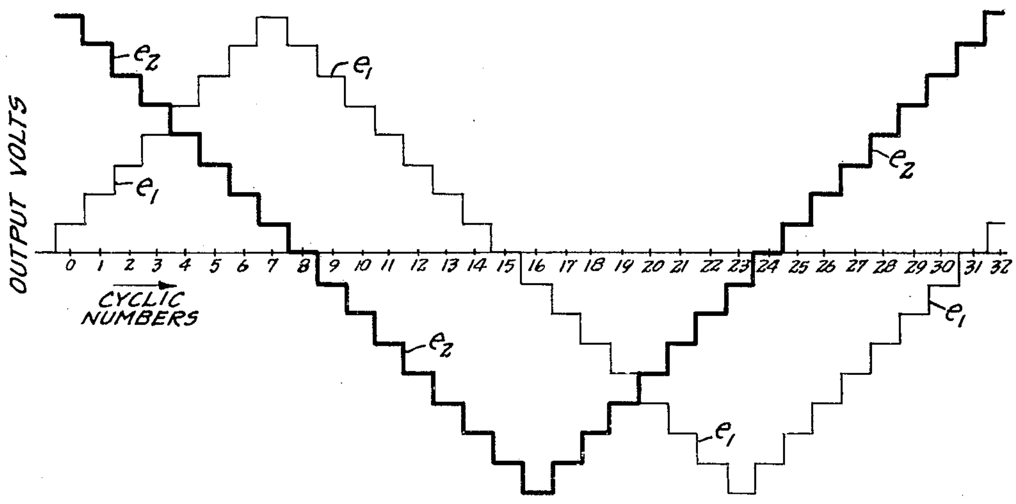
Fig. 3 is an output-voltage diagram for the converter of Fig. 2.

In Fig. 3, is graphically illustrated the output voltages $e_1$ and $e_2$ across the secondary windings 112 and 109, respectively, for one complete cycle of five-digit cyclic numbers. The two voltage functions $e_1$ and $e_2$ are thus impressed upon the space-quadrature deflection systems of cathode-ray tube 111 and provide a representation of a complex number having an instantaneous modulus K equal to $e_1$ and $e_2$, and an angular-position function $\theta$ equal to $$\tan^{-1}\left(\frac{e_1}{e_2}\right)$$

wherein the modulus K is substantially constant.

It is to be understood that the cathode-ray tube 111 may be replaced with a continuous rotary linear potentiometer for deriving, with respect to a given cyclic number, an error voltage having a magnitude and sense dependent on the angular displacement of a shaft. For such an application, the secondary windinsg 109 and 112 are connected to diametrically opposite points on the potentiometer, the connecting points for each winding being in a space quadrature relationship. Furthermore, as is well known by those skilled in the art, the accuracy of the analog displacement of the potentiometer shaft may be extended by employing two-speed systems such as a conventional "one and thirty-two speed servo system." For example, a multispeed system for connecting a ten-digit cyclic code could employ two converters as shown in Fig. 2 with linear potentiometers replacing the cathode-ray tubes. The first converter would control a one-speed potentiometer shaft by the first five digits in the code, and the second converter would control a thirty-two speed potentiometer shaft by the last five digits in the code.

It will be seen that I have described an improved digital-to-analog converter featuring simplicity and inexpensive construction. The particular circuits shown have employed relays and switches for ease of description, but electronic switches, such as tubes, transistors and the like may be employed for higher-speed response. Also, the systems described lend themselves to accommodation of increased numbers of digits, as for example by employing two of the systems of Fig. 2 (32 positions each) to accommodate 32×32, or $2^{10}$ positions.

While the invention has been described in detail for the preferred forms shown, it is to be understood that various modifications may be effected by persons skilled in the art without departing from the principle and scope of the invention as defined in the appended claims.

What is claimed is:

1. A digital-to-analog converter, comprising a pair of input terminals, a pair of output terminals, a first branch circuit connected from one input terminal to one output terminal, a second branch circuit connected from the other input terminal to said one output terminal, a voltage source connected across said input terminals, the other output terminal being connected to said voltage source, a pair of first resistors, a plurality of pairs of resistors, said first branch, circuit including one of said first resistors, said second branch circuit including the other of said first resistors, and double pole switch means with one pole associated with each pair of said plurality of pairs of resistors and with the other pole associated with said first and second branch circuits for selectively switching one resistor from each pair of said plurality of pairs of resistors into either said first branch circuit or said second branch circuit and to reverse the polarity of the voltage input to the next succeeding pair of resistors.

2. A digital-to-analog converter, comprising a pair of input terminals, a pair of output terminals, a voltage source connected across said input terminals, means referencing one output terminal to said source, a plurality of pairs of resistors, two separate circuits connecting the other output terminal to the respective poles of said source, and double pole selective switching means with one pole for selectively switching one resistor from each pair of said plurality of pairs of resistors into one or the other of said circuits and with the other pole for simultaneously reversing the polarity of the voltage input to the next succeeding pair of resistors.

3. A digital-to-analog converter, comprising a pair of input terminals, a pair of output terminals, a first branch circuit connected from one input terminal to one output terminal, a second branch circuit connected from the other input terminal to said one output terminal, a voltage source connected across said input terminals, the other output terminal being connected to said voltage source, a pair of first resistors, a plurality of pairs of resistors, the first pair of resistors in said plurality of pairs of resistor having a resistance value equal to twice the resistance value of said first pair of resistors, each successive pair of resistors in said plurality of pairs of resistors having a resistive value equal to twice the resistive value of each preceding pair of resistors in said plurality of pairs of resistors, said first branch circuit including one of said first resistors, said second branch circuit including the other of said first resistors, and means connected to said plurality of pairs of resistors and said first and second branch circuit for selectively switching one resistor from each pair of said plurality of pairs of resistors into either said first branch circuit or said second branch circuit in accordance with digital input data.

4. A digital-to-analog converter comprising a pair of input terminals, a pair of output terminals, a voltage source connected across said input terminals, means referencing one output terminal to said source, a plurality of pairs of resistors, two separate circuits connecting the other output terminal to the respective poles of said source, first selective switching means selectively switching one resistor from each pair of said plurality of pairs of resistors into one or the other of said circuits in accordance with digital input data, second selective switching means for selectively switching the polarity of connection of said one output terminal to said source.

5. A digital-to-analog converter, comprising a pair of input terminals, a pair of output terminals, a first branch circuit connected from one input terminal to one output terminal, a second branch circuit connected from the other input terminal to said one output terminal, a voltage source connected across said input terminal, the other output terminal being connected to said voltage source, a pair of first resistors, a plurality of pairs of resistors, said first branch circuit including one of said first resistors, said second branch circuit including the other of said first resistors, means connected to said plurality of pairs of resistors and said first and second branch of circuits for selectively switching one resistor from each pair of said plurality of pairs of resistors into either said first branch circuit or said second branch circuit in accordance with digital input data, said means including a plurality of control circuits and a plurality of relays, each control circuit being adapted to receive single-digit pulsating signals, each relay having a solenoid coil and a switch operatively actuated by its solenoid coil, one solenoid coil of each relay being connected respectively to one of said plurality of control circuits, and the switch of each relay being connected to said first branch circuit, said second circuit and one pair of resistors in said plurality of pairs of resistors.

6. A digital-to-analog converter as claimed in claim 5, wherein said switch is a double-pole-double-throw switch.

7. A digital-to-analog converter, comprising a pair of input terminals, a pair of output terminals, a first branch circuit connected from one input terminal to one output terminal, a second branch circuit connected from the other input terminal to said one output terminal, a voltage source connected across said input terminals, the other output terminal being connected to said voltage source, a pair of first resistors, a plurality of pairs of resistors, said first branch circuit including one of said first resistors, said second branch circuit including the other of said first resistors, means connected to said plurality of pairs of resistors and said first and second branch circuits for selectively switching one resistor from each pair of said plurality of pairs of resistors into either said first branch circuit or said second branch circuit in accordance with digital input data, said second output terminal being connected to one side of said voltage source, a third branch circuit being connected from said output terminal to said one side of said voltage source, a fourth branch circuit connected from said one output terminal to the other side of said voltage source, a pair of transformers, each transformer having a primary center-tapped winding and an output winding, first digit means connected to said third branch circuit and one transformer of said pair of transformers for selectively switching, in accordance with first digit digital data, either half of the center-tapped primary winding of said other transformer into said fourth branch circuit.

8. A digital-to-analog converter as claimed in claim 7, wherein the first-mentioned means includes a plurality of control circuits and a plurality of relays, each control circuit being adapted to receive single-digit pulsating signals, each relay having a solenoid coil and a switch operatively actuated by its solenoid coil, one solenoid coil of each relay being connected respectively to one of said plurality of control circuits, the switch of each of said plurality of relays being connected to said first branch circuit, said second branch circuit, and one pair of resistors in said plurality of pairs of resistors; wherein the said first digit means includes a first digit-control circuit adapted to receive first digit pulsating signals, a first relay having a solenoid coil and a switch operatively actuated by its solenoid coil, the solenoid coil of said first relay being connected across said first control circuit, the switch of said first relay being connected to said third branch circuit and the center-tapped primary winding of said one transformer; and wherein the said second digit means includes a second digit-control circuit adapted to receive second digit pulsating signals, and a second relay having a solenoid coil and a switch operatively actuated by its solenoid coil, the solenoid coil of said second relay being connected across said second digit control circuit, the switch of said second relay being connected to the center-tapped primary winding of said other transformer and the said fourth branch circuit.

9. A digital-to-analog converter as claimed in claim 7, including a cathode ray tube having a horizontal deflection system being connected to the output winding of said one transformer and said vertical deflection system being connected to the output winding of said other transformer.

10. A digital-to-analog converter, comprising a pair of input terminals, a pair of output terminals, a voltage source connected across said input terminals, means referencing one output terminal to said source, a plurality of pairs of resistors, two separate circuits connecting the other output terminal to the respective poles of said source, selective switching means selectively switching one resistor from each pair of said plurality of pairs of resistors into one or the other of said circuits in accordance with digital input data, said referencing means including a first output-circuit connection to one pole of said source and a second output-circuit connection to the other pole of said source.

11. A converter according to claim 10, and including cathode-ray display means having coordinate deflection systems, one deflection system being connected to respond to voltage developed in said one output-circuit connection, the other deflection system being connected to respond to voltage developed in said second output-circuit connection.

12. A converter according to claim 11, in which each of said deflection-system connections includes polarity-reversing means.

References Cited in the file of this patent

UNITED STATES PATENTS 2,738,504 Gray ---------------- Mar. 13, 1956